United States Patent
Manolov

(10) Patent No.: US 7,747,755 B2
(45) Date of Patent: Jun. 29, 2010

(54) METHOD AND APPARATUS FOR SESSION MANAGEMENT IN AN ENTERPRISE JAVA BEAN SESSION BEAN

(75) Inventor: Svetoslav H. Manolov, Sofia (BG)

(73) Assignee: SAP AG, Walldorf (DE)

( * ) Notice: Subject to any disclaimer, the term of this patent is extended or adjusted under 35 U.S.C. 154(b) by 1076 days.

(21) Appl. No.: 11/241,474

(22) Filed: Sep. 30, 2005

(65) Prior Publication Data
US 2007/0078855 A1    Apr. 5, 2007

(51) Int. Cl.
G06F 15/16    (2006.01)
G06F 15/173    (2006.01)

(52) U.S. Cl. ...................................... 709/227; 709/223
(58) Field of Classification Search ................ 709/227, 709/223
See application file for complete search history.

(56) References Cited

U.S. PATENT DOCUMENTS 6,807,547 B2 * 10/2004 Matena et al. .......... 707/103 R
7,284,091 B2 * 10/2007 Chow et al. ................. 711/118

* cited by examiner

Primary Examiner—Paul H Kang
(74) Attorney, Agent, or Firm—Schwegman, Lundberg & Woessner, P.A.

(57) ABSTRACT

A method and apparatus to provide a general-purpose timeout management system for client-specific session objects. In one embodiment a timeout service is created that may be used by more than one Java Enterprise EJB container simultaneously, avoiding unnecessary duplication of timeout management services. Each EJB container may instantiate an "invalidation agent" which registers a callback interface with the timeout service. The timeout service invokes a timeout callback method on registered invalidation agents at specified time intervals. The time intervals correspond to the timeout values associated with the client-specific objects, obviating the need for the EJB container to make time-consuming queries to the system clock. The invention discloses a "timeout marker" data element associated with each client-specific session object created by the EJB container. Whenever a client accesses a client-specific session object, the timeout marker associated with that object is cleared. Then, when the invalidation agent's timeout callback is invoked, the invalidation agent checks the timeout marker on each registered object to determine whether it was accessed since the last timeout period. If the object was not accessed it may be terminated; otherwise it may be retained and re-marked.

23 Claims, 2 Drawing Sheets

METHOD AND APPARATUS FOR SESSION MANAGEMENT IN AN ENTERPRISE JAVA BEAN SESSION BEAN

FIELD OF INVENTION

The field of invention relates generally to resource management in application servers and, more particularly, to a method and apparatus for session management of client-specific objects within a Java Enterprise Java Bean™ environment.

BACKGROUND

Java 2 Enterprise Edition™ ("J2EE") is a specification for building and deploying distributed enterprise applications. Unlike traditional client-server systems, J2EE is based on a multi-tiered architecture in which server side program code is divided into several layers including a "presentation" layer and a "business logic" layer. This separation allows developers to keep the code responsible for presenting the user interface aspects of the application separate from the code running the "backend" or business logic of the application.

A separate J2EE container manages each of the different layers in a J2EE application. Containers are runtime environments that provide standard common services to runtime components. For instance, the J2EE application server may contain presentation code implemented as Java Server Pages™ ("JSP") or Java Servlets™. These components run within the J2EE web container, which is responsible for managing Hypertext Transfer Protocol ("HTTP") or secure HTTP ("HTTPS") connections. The J2EE application server may also contain business-logic implemented as Enterprise Java Beans™ ("EJB"). These components run within the J2EE EJB container, which is responsible for creating, destroying, and otherwise managing the EJB object instances.

Clients may access an application running on a J2EE server in a variety of different ways. For example, a client may use a web-browser to access the application through its web container. Alternatively, a client may use a stand-alone client application to access the business-logic in the EJB container via Remote Method Invocation ("RMI"), Common Object Request Broker Architecture ("CORBA"), or the like.

Regardless of how the client accesses the system, the server-side application is generally responsible for managing the session data associated with each client interaction. Session data defines the current conversational state between a client and the application server. For example, if the user is purchasing books from an online bookstore, the session data may define the current state of the user's "shopping cart" (e.g., the books the user has selected for purchase). Similarly, an application may require the user to login and session data is often used to hold the login authentication information for the duration of the client's transaction.

Session data is only needed while the client is using the application and may be discarded after the user is finished. As such, session data is not typically stored in a database, which would add unnecessary overhead to the application. Instead session data is stored in memory where it may be accessed quickly. The J2EE environment provides stateful session beans for this purpose. Stateful session beans are business logic objects that are associated with a specific client session and, as such, may be used to hold client-specific session data. The EJB container is responsible for managing stateful session beans and associating them with the proper client session.

Stateful Session Beans allow J2EE applications to deliver complex applications efficiently by keeping track of client-specific session data, but their use can lead to server resource problems. Each stateful session bean instance requires system resources and the EJB container can only support a finite number at any given time. This problem is exacerbated because it is often difficult for the EJB container to determine when stateful session bean objects can be safely removed. For instance, when a client is finished using a web-based application she may simply close the web-browser instead of first logging out; thus, since HTTP is a connectionless protocol, the EJB container will not receive any indication that the user is finished using the application. As such, the EJB container will not know that it is safe to remove the stateful session beans associated with that client since, as far as the EJB container is concerned, the client is still using the application. If enough users exit the system in this manner there will eventually be enough "dead-letter" stateful session bean instances to completely consume the server's resources.

Traditionally, EJB containers have addressed this problem using a Least Recently Used ("LRU") style approach to remove old stateful session beans. In this method, the EJB container keeps a record of the time each bean was last accessed by a client. Then, in the event that application server memory resources become scarce, those beans with the longest time since last access (least recently used) are removed from memory and stored on disk. Finally, if beans are not requested from disk for some period of time, they are completely erased. This approach has a number of limitations. First, the timeout management code is completely encapsulated within the EJB container. As such, if an application uses more than one EJB container, the EJB timeout management service is unnecessarily duplicated. Second, EJBs may allocate system resources that should be released when the bean is removed. According to the EJB specification, code to release these resources is placed in the bean's ejbRemove( ) method to be invoked as the EJB container removes the bean. However, since timed-out EJBs are stored on disk before being erased, their ejbRemove( ) method is never invoked, creating the potential for resource leaks. Third, disk access to store and remove timed-out EJBs is relatively slow and can degrade server performance. Finally, each time a bean is accessed the EJB container must make a time-consuming call to the system clock to set the bean's last access time, further degrading server performance.

SUMMARY

A method and apparatus are described to provide a general-purpose timeout management system for Java Enterprise session objects. The invention discloses a timeout service that may be used by more than one EJB container simultaneously, avoiding unnecessary duplication of timeout management services. Each EJB container may instantiate an "invalidation agent" which registers a callback interface with the timeout service. The timeout service will invoke a timeout callback method on registered invalidation agents at specified time intervals. The time intervals correspond to the timeout values associated with the client-specific objects, obviating the need for the EJB container to make time-consuming queries to the system clock. The invention discloses a "timeout marker" data element associated with each client-specific object created by the EJB container. Whenever a client accesses a client-specific business logic object, the timeout marker associated with that object is cleared. Then, when the invalidation agent's timeout callback is invoked, the invalidation agent checks the timeout marker on each registered object to determine whether it was accessed since the last timeout period. If the object was not accessed it may be terminated; otherwise it may be retained and re-marked.

BRIEF DESCRIPTION OF THE DRAWINGS

A better understanding of the present invention can be obtained from the following detailed description in conjunction with the following drawings, in which.

DETAILED DESCRIPTION

Figure 1:
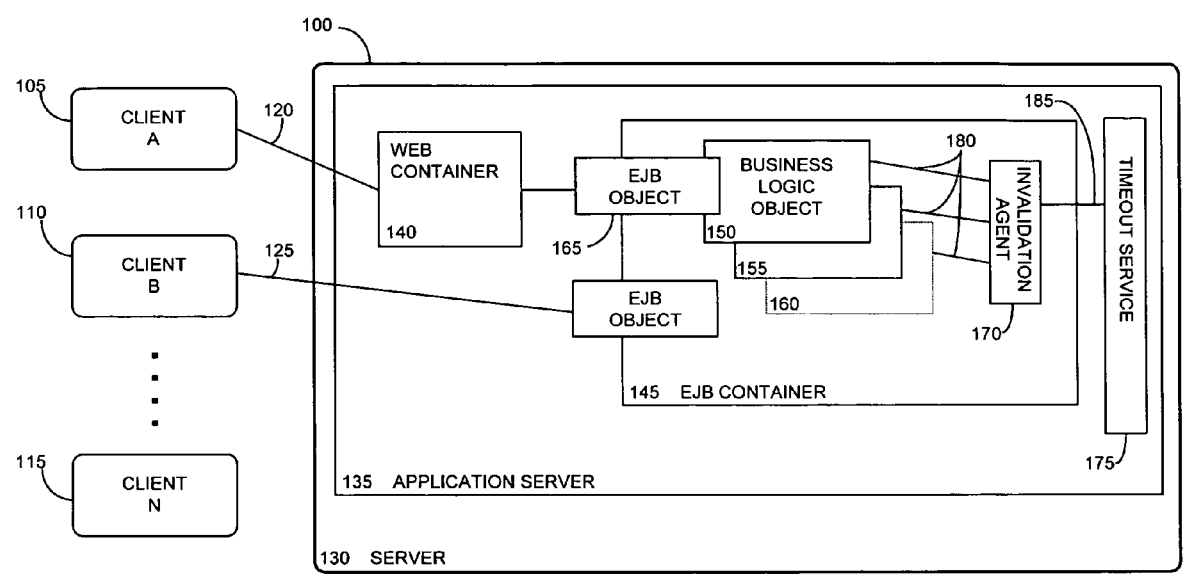
FIG. 1 illustrates the session management system running in conjunction with an EJB container within an EJB application server, in an embodiment of the invention.

A system architecture according to one embodiment of the invention is illustrated in FIG. 1. The architecture includes one or more clients 105, 110, and 115, in communication with a server 130. The server 130 may host an application server 135 that, in turn, may include a web container 140 and EJB container 145. The web container 140 may host the user interface or "presentation layer" of an application and the EJB container 145 may be used to provide the back end or "business logic" for the application.

Clients may access the services hosted by the application server 135 in a number of different ways. For instance, a web based client such as Client A 105, may access the application server 135 using a web-browser program via protocol 120 such as HTTP, HTTPS, or the like. Alternatively a client, such as Client B 110, may access the business logic layer of the application directly using a protocol 125 such as Remote Method Invocation ("RMI"), Common Object Request Broker Architecture ("CORBA"), or the like. It is well known in the art that a number of different clients 115 could access the server 130 using a variety of different protocols.

With regards to Client A 105, the user may direct a web-browser program to the server 130 hosting the application server 135. This action may cause an HTTP request to be sent to server 130 that may be routed to the application server 135. The application server may respond to the request using the presentation layer code running in web container 140, causing user interface elements to be displayed on Client A 105. The application may include back-end business logic implemented in the EJB container 145.

The application accessed by the client may utilize the business logic code causing the EJB container to instantiate business logic objects 150, 155, and 160, which are accessible through the generic EJB interface 165. One or more of the business logic objects 150, 155, and 160, may be a stateful session bean that the application may use to store client-specific session data. When the EJB container 145 creates a new business logic object it may register the object with the invalidation agent 170. Responsive to this registration the invalidation agent 170 may store a reference 180 to the business logic object. The invalidation agent 170 may maintain a record of registered business logic objects using an in-memory data structure, database, or the like.

The invalidation agent 170 is in communication with the timeout service 175 using callback interface 185 which may be a direct method call, RMI, or the like. Although the embodiment represented in FIG. 1 shows the timeout service 175 running on the same application server 135 as the EJB container 145 it would be appreciated by those skilled in the art that the timeout service 175 could exist on a remote server.

The timeout service uses the callback mechanism 185 to invoke a timeout method on the invalidation agent 170 at specified time intervals. The interval at which the timeout service 175 invokes the timeout callback corresponds to the timeout period for the registered business logic objects and may be configured in the business logic object deployment descriptor or another configuration mechanism.

Figure 2:
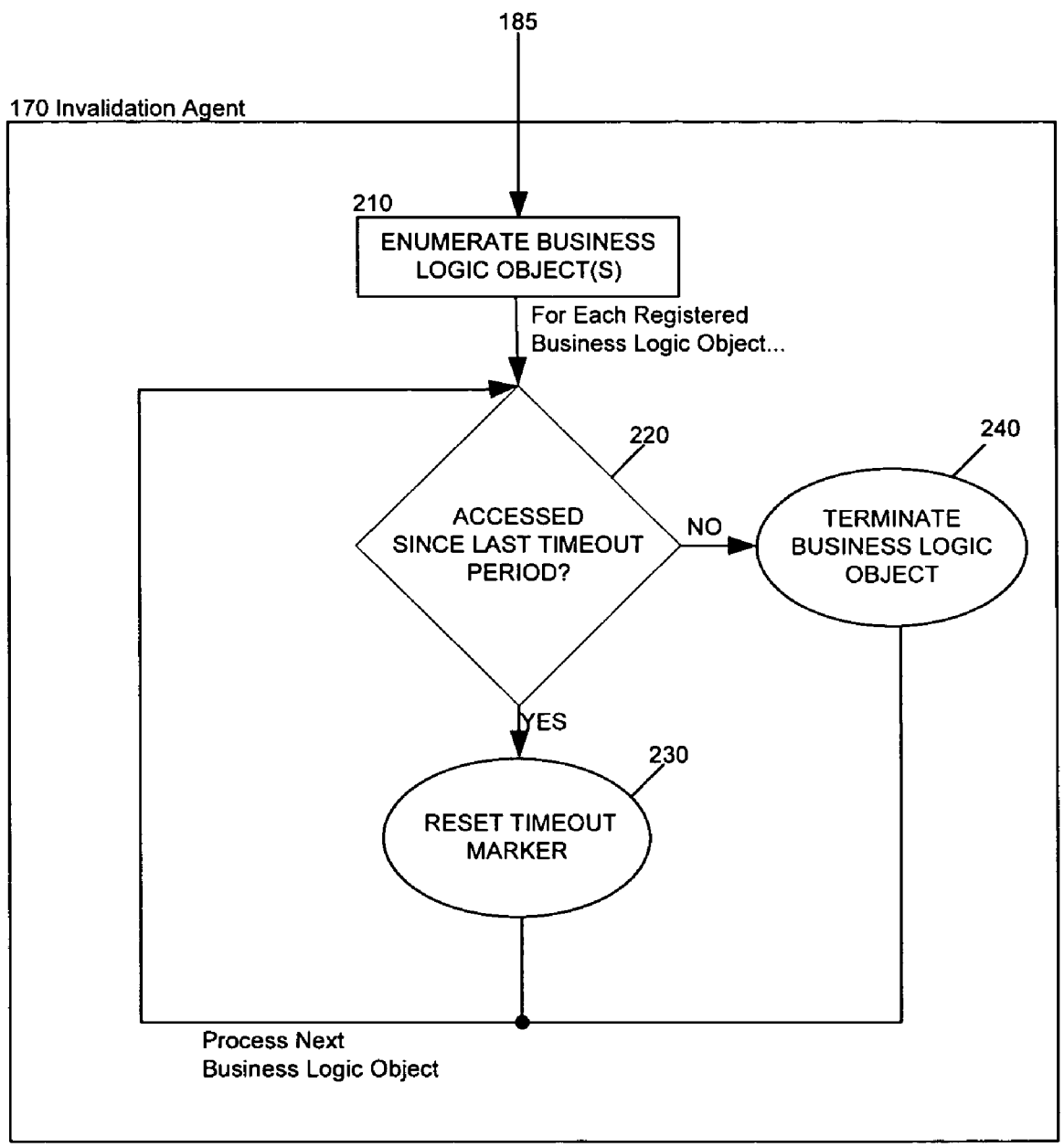
FIG. 2 is a block diagram illustrating the invalidation agent component of the session management system of FIG. 1 in further detail, in accord with an embodiment of the invention.

FIG. 2 illustrates certain aspects of the method to be performed by the invalidation agent 170 when its timeout callback is invoked using callback mechanism 185. Responsive to this event, the invalidation agent 170 enumerates all of the business logic object(s) 210 that have been registered with it. As each business logic object is enumerated, block 220 determines whether the object was requested since the last timeout period. This determination could be made by checking the state of the timeout marker associated with the business logic object, which could be a member variable of the object, an element of the data structure making up the object, or any other mechanism to associate a piece of data with the object. The timeout marker may indicate that a client accessed the object during the last timeout period. In this case the object is processed by block 230 where its timeout marker is reset in preparation for the next timeout period. However, if the timeout marker indicates that a client did not request the object during the last timeout period, the object may be terminated as shown in block 240. Those skilled in the art would appreciate that such termination may occur by de-allocating the memory associated with the object or, in managed memory systems, by invalidating all references to the object to allow it to be removed by the memory management system. To be sure that active session objects are retained, the EJB container 145 sets the timeout marker on business logic objects whenever they are accessed by a client.

Processes taught by the discussion above may be performed with program code such as machine-executable instructions, which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

A computing system (such as a server) can execute program code stored by an article of manufacture. The applicable article of manufacture may include one or more fixed components (such as a hard disk drive or memory) and/or various movable components such as a CD ROM, a compact disk, a magnetic tape, or the like. In order to execute the program code, typically instructions of the program code are loaded into the Random Access Memory (RAM); and, the processing core then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments (e.g., a .NET environment, a Windows/NT environment each provided by Microsoft Corporation).

In the foregoing specification, the invention has been described with reference to specific exemplary embodiments thereof. It will, however, be evidence that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   receiving an initial request from a client for an instance of a session bean object, the client operatively coupled to an application server that includes an object runtime environment and a timeout service external to the object runtime environment, the object runtime environment further including an invalidation agent to interface with the timeout service;
   creating a marked instance of the session bean object responsive to receipt of the initial client request, the instance of the session bean object included in the object runtime environment;
   registering the instance of the session bean object with the invalidation agent;
   unmarking the instance of the session bean object responsive to the receipt of an additional client request for the instance of the session bean object;
   receiving a notification from the timeout service at specified time intervals, where the notification causes the invalidation agent to process the registered instance of the session bean object, such processing including:
   terminating marked instances of session bean objects, and
   marking unmarked instances of session bean objects.

2. The method of claim 1, wherein marking the unmarked instances of session bean objects includes setting a Boolean flag as a property of the instance of session bean object.

3. The method of claim 1, wherein the client requests are received over a network connection.

4. The method of claim 1, wherein registering the instance of the session bean object includes identifying the instance of the session bean object to be registered and the time interval at which to receive notifications from the timeout service.

5. The method of claim 4, wherein the time interval is specified as a property of the session bean object.

6. The method of claim 4, wherein the time interval is specified in the deployment descriptor of the session bean object.

7. The method of claim 1, wherein the session bean objects are Java Enterprise stateful session bean objects.

8. The method of claim 7, wherein the application server is a Java Enterprise application server.

9. A system, comprising:
   a Java Enterprise application server to support an enterprise java bean ("EJB") container comprising a plurality of EJB components, the Java Enterprise application server operatively coupled to a client and to include a timeout service executed via a processor;
   an EJB container included in the Java Enterprise application server, the EJB container to further include
   an EJB invalidation agent to register with the timeout service,
   a remote interface to receive a requests from the client for an instance of a session bean object,
   a first EJB component to create a marked instances of the session bean object responsive to the receipt of an initial client request,
   a second EJB component to register the instance of the session bean object with the EJB invalidation agent, and
   a third EJB component to unmark the instance of the session bean object responsive to the receipt of additional client requests for the instance of the session bean object;
   wherein the timeout service is external to the EJB container and the EJB invalidation agent receives a notification from the timeout service at specified time intervals, where the notification causes the registered instance of the session bean object to be processed, such processing including:
   terminating marked instances of session bean objects, and
   marking unmarked instances of session bean objects.

10. The system of claim 9, further comprising an agent to set a Boolean flag as a property of the instance of the session bean object.

11. The system of claim 9, wherein the client requests are received over a network connection.

12. The system of claim 9, wherein the EJB component to register the instance of the session bean object with the EJB invalidation agent comprises the EJB component to identify the instance of the session bean object to be registered and the time interval at which to receive notifications from the timeout service.

13. The system of claim 12, wherein the time interval is specified as a property of the session bean object.

14. The system of claim 12, wherein the time interval is specified in the deployment descriptor of the session bean object.

15. The system of claim 9, wherein the session bean object is a Java Enterprise stateful session bean.

16. A machine-readable storage medium embodying instructions that, when executed by a machine, causes the machine to perform a method, the method comprising:
   receiving an initial request from a client for an instance of a session bean object, the client operatively coupled to an application server that includes an object runtime environment and a timeout service external to the object runtime environment, the object runtime environment further including an invalidation agent to interface with the timeout service, the timeout service executed via a processor;
   creating a marked instance of the session bean object responsive to receipt of the initial client request, the instance of the session bean object included in the object runtime environment;
   registering the instance of the session bean object with the invalidation agent;
   unmarking the instance of the session bean object responsive to the receipt of an additional client request for the instance of the session bean object;
   receiving a notification from the timeout service at specified time intervals, where the notification causes the invalidation agent to process the registered instance of the session bean object, such processing including:
   terminating marked instances of session bean objects, and
   marking unmarked instances of session bean objects.

17. The machine-readable storage medium of claim 16, wherein the invalidation agent further comprises an agent to set a Boolean flag as a property of an instance of session bean object.

18. The machine-readable storage medium of claim 16, wherein the client requests are received over a network connection.

19. The machine-readable storage medium of claim 16, wherein registering the instance of the session bean object with the invalidation agent comprises identifying the instance of the session bean object to be registered and the time interval at which to notify the invalidation agent.

20. The machine-readable storage medium of claim 19, wherein the time interval is specified as a property of the session bean object.

21. The machine-readable storage medium of claim 19, wherein the time interval is specified in the deployment descriptor of the session bean object.

22. The machine-readable storage medium of claim 16, wherein the session bean object is a Java Enterprise stateful session bean.

23. The machine-readable storage medium of claim 22, wherein the application server is a Java Enterprise application server.

* * * * *